(12) United States Patent
Udono (10) Patent No.: US 7,804,527 B2
(45) Date of Patent: Sep. 28, 2010

(54) DIGITAL CAMERA AND IMAGE RECORDING METHOD FOR SORTING IMAGE DATA AND RECORDING IMAGE DATA IN RECORDING MEDIUM

(75) Inventor: Shinichiro Udono, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 958 days.

(21) Appl. No.: 11/489,454

(22) Filed: Jul. 20, 2006

(65) Prior Publication Data
US 2007/0030360 A1 Feb. 8, 2007

(30) Foreign Application Priority Data
Jul. 21, 2005 (JP) ............... 2005-211833

(51) Int. Cl.
H04N 5/76 (2006.01)
H04N 5/222 (2006.01)
(52) U.S. Cl. .................. 348/231.2; 348/333.02
(58) Field of Classification Search .......... 348/231.2, 348/231.99, 231.3, 231.4, 231.5
See application file for complete search history.

(56) References Cited

U.S. PATENT DOCUMENTS

| | | | | |
|---|---|---|---|---|
| 5,633,678 A | * | 5/1997 | Parulski et al. | 348/231.5 |
| 6,995,792 B1 | * | 2/2006 | Ogura | 348/231.99 |
| 7,184,082 B2 | * | 2/2007 | Yokokawa | 348/231.2 |
| 7,358,990 B2 | * | 4/2008 | Morino | 348/231.2 |
| 7,386,576 B2 | * | 6/2008 | Watanabe et al. | 707/201 |
| 2005/0027926 A1 | * | 2/2005 | Koh et al. | 711/100 |
| 2005/0083406 A1 | * | 4/2005 | Cozier | 348/207.1 |
| 2006/0044417 A1 | * | 3/2006 | Tashiro et al. | 348/231.3 |
| 2007/0013790 A1 | * | 1/2007 | Nakase | 348/231.99 |

FOREIGN PATENT DOCUMENTS

| | | | |
|---|---|---|---|
| JP | 2001054041 A | * | 2/2001 |
| JP | 2003-319296 A | | 7/2003 |
| JP | 2004228987 A | * | 8/2004 |
| JP | 2004-304619 A | | 10/2004 |

OTHER PUBLICATIONS

Machine Translation of JP 2001-054041 A.*

* cited by examiner

*Primary Examiner*—John M Villecco
(74) *Attorney, Agent, or Firm*—Birch, Stewart, Kolasch & Birch, LLP (57) ABSTRACT

In case there is no image file with an event name in a memory card when a digital camera is turned on the first time on the day, an asking sentence asks whether to create a new event name or not. When "Yes" is selected, event tag data showing "Event 1" is applied to an image file. When "No" is selected, event tag data showing "No event" is applied to an image file. In case there is an image file of "Event n" in the memory card, a selection screen is displayed to select one of options, which are to apply a new event name "Event n+1", to apply the existing event name "Event n" and to apply no event name. In the second or later turn on of the digital camera, the event name selected in the first turn on is automatically applied to the event tag data.

9 Claims, 6 Drawing Sheets

DIGITAL CAMERA AND IMAGE RECORDING METHOD FOR SORTING IMAGE DATA AND RECORDING IMAGE DATA IN RECORDING MEDIUM

BACKGROUND OF THE INVENTION

1. Field of the Invention

The present invention relates to a digital camera and an image recording method, and more particularly to a digital camera and an image recording method which sort image data and record the image data in a recording medium.

2. Description Related to the Prior Art

A digital camera, which converts image signals outputted from a solid-state imaging device such as CCD into digital image data and records the image data in a memory card, is in widespread use. To each image data, a sequence number representing an image capturing date and an image capturing order is applied before recording of the image data in the memory card. The memory card has been upgrading to have larger storage capacity, allowing to record larger quantity of image data in one memory card. Accordingly, there is growing demand for effectively sorting the image data in the memory card.

For example, Japanese patent laid-open publication No. 2004-304619 discloses a digital camera, in which a folder is newly created in a memory card and image data obtained by image capturing is stored as an image file in the folder when a shutter button is depressed after depressing a folder creation switch. Following image capturing is performed by depression of only the shutter button without depressing the folder creation switch, and image data obtained by image capturing is stored in the same folder until a next folder is created.

In addition, Japanese patent laid-open publication No. 2003-319296 discloses a digital camera, in which a predetermined folder in an incorporated memory is designated and image data is stored in this folder, when the digital camera is turned on. When a user wants to designate another folder, the user operates a folder switching ring, and a folder indicated by the folder switching ring is used for storing image data obtained by following image capturing.

However, in the digital camera of Japanese patent laid-open publication No. 2004-304619, there is the need to operate the folder creation switch before staring the image capturing. This operation is a bother. In addition, if the user unintentionally forgets the operation of the folder creation switch, the folder is not created and the image data is not sorted.

In the digital camera of Japanese patent laid-open publication No. 2003-319296, there is the need to operate the folder switching ring for the image capturing. In addition, there is the need to designate a folder every time the turn on of the digital camera. This operation becomes a great bother when the digital camera is frequently turned on/off.

SUMMARY OF THE INVENTION

An object of the present invention is to provide a digital camera and an image recording method which enable easy and sure sorting and recording of image data.

In order to achieve the above object and other objects, a digital camera of the present invention comprises a power switch to turn on the digital camera, a detecting section to detect whether the turn on of the digital camera is the first time after the date is changed or not when the power switch is operated, a selecting section to select an event name for tag information from plural options when the detection section detects that the turn on is the first time, and an event name applying section to apply information of the event name selected by the selecting section to tag information. The tag information is additional information to the image data obtained by image capturing, and an image file including the image data and the tag information is recorded in a recording medium. A plurality of the image files including the tag information with same event name constitutes an image group.

It is preferable that the plural options are to apply a new event name, to apply an event name existing in the recording medium, and to apply no event name. It is preferable that the event name applying section applies information of the event name selected in the first turn on of the digital camera to the tag information of the image subsequently captured when the detection section detects that the turn on is not the first time. It is preferable that the event name includes a number which is automatically incremented when the selecting section selects to apply a new event name from the options.

An image recording method of the present invention comprises steps of turning on an imaging apparatus, detecting whether the turn on of the imaging apparatus is the first time after the date is changed or not, selecting an event name for tag information from plural options when it is detected that the turn on is the first time, and applying information of the event name selected by the selecting step to the tag information for image data obtained by following image capturing.

According to the digital camera and the image recording method of the present invention, the plural options for application of the event name are automatically displayed in the first turn on of the imaging apparatus (digital camera) on the day. Therefore, easy and sure sorting and recording of the image data can be performed and failure to apply the event name can be prevented only by selecting the options at the first image capturing on the day.

In the second and subsequent turn on of the imaging apparatus on the day, since the event name selected in the first turn on is applied to the tag information until the user manually change or cancel the event name, the sorting and recording of the image data can be performed without tiresome operations. In addition, since the event name includes a number which is automatically incremented event by event, the user is free from a burden of thinking about new event names and can concentrate on the image capturing in the new event.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
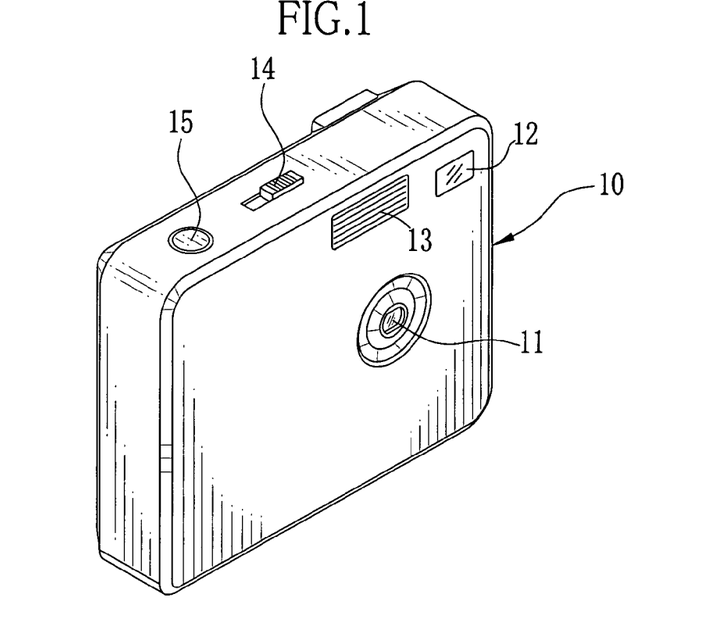
FIG. 1 is a front perspective view of a digital camera of the present invention.
Figure 2:
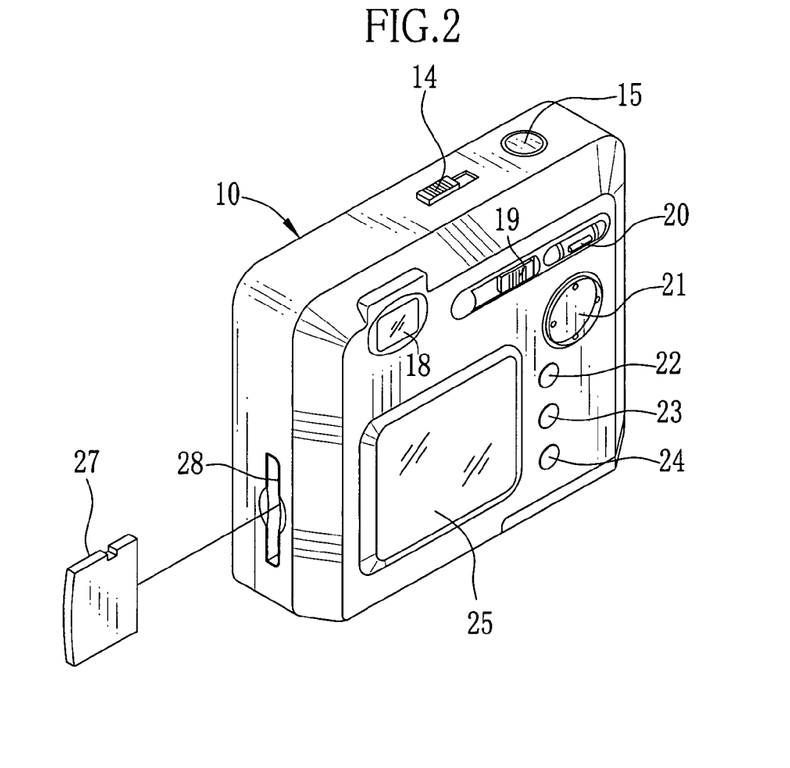
FIG. 2 is a rear perspective view of the digital camera.

As shown in FIG. 1, a digital camera 10 has a taking lens 11, a front viewfinder window 12 and a flash projector 13 on its front, a power switch 14 and a shutter button 15 on its top. As shown in FIG. 2, a rear viewfinder window 18, a mode selection switch (SW) 19, a zoom button 20, a multipurpose key 21, a menu/OK button 22, a back button 23, a display button 24 and a liquid crystal panel 25 are disposed on a back of the digital camera 10.

A slot 28 into which a memory card 27 is inserted is provided on one side of the digital camera 10. As the memory card 27, although an xD-Picture Card (trade name) is used in this embodiment, another type of memory card such as a SmartMedia (trade name), a Compact Flash (registered trademark) and a PC Card type memory card may be used. In addition, another recording media such as a Microdrive (trade name) may be used instead of the memory card.

The mode selection SW 19 is operated to select between an imaging mode for capturing image and a reproduction mode for reproducing images recorded on the memory card 27. In the imaging mode, the liquid crystal panel 25 works as an electric viewfinder. In the reproduction mode, the images read from the memory card 27 are reproduced (displayed) on the liquid crystal panel 25.

In addition, on the liquid crystal panel 25, a setting screen is displayed to perform various settings. The setting screen includes various setting items. A user operates the multipurpose key 21 and the menu/OK button 22 with monitoring the setting screen, to perform the settings.

Figure 3:
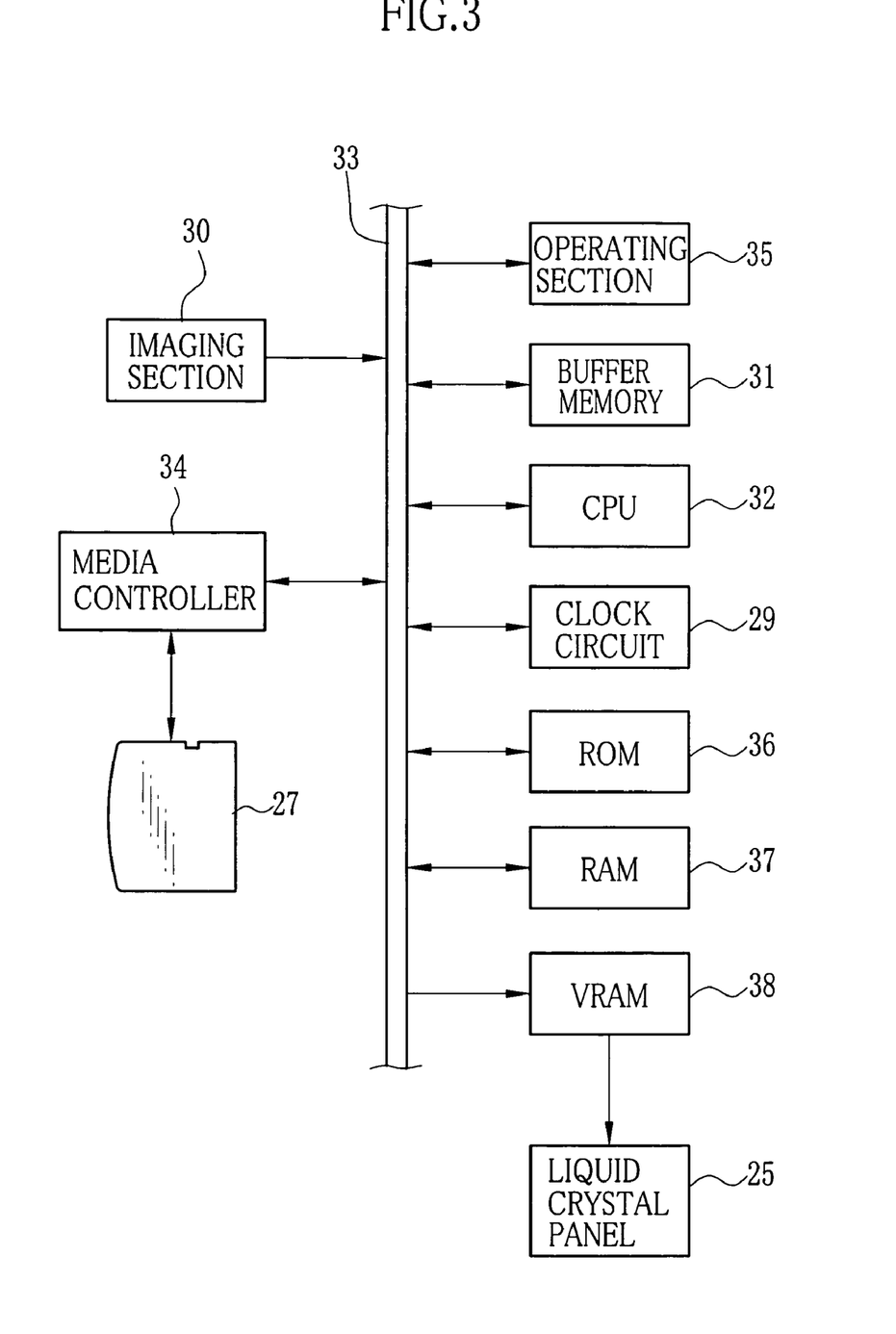
FIG. 3 is a block diagram showing an electronic construction of the digital camera.

In FIG. 3, an imaging section 30 comprises the taking lens 11, a CCD, an A/D converter and so on. Image data outputted from the imaging section 30 is compressed by a compression technology such as JPEG, and recorded on a buffer memory 31. A CPU 32 controls each component connected thereto through a data bus 33.

The CPU 32 controls a media controller 34 and accesses the memory card 27 to create a folder in the memory card 27, to read out the image data from the buffer memory 31 and store it in the folder in the memory card 27, and to read out the image data from the memory card 27. In addition, the CPU 32 refers to signals outputted from a clock circuit 29 to judge whether it is a first power on of the digital camera 10 after the date is changed or not.

An operating section 35 includes the power switch 14, the shutter button 15, the mode selection SW 19, the zoom button 20, the multipurpose key 21, the menu/OK button 22, the back button 23 and the display button 24. In a ROM 36, various programs are stored. The CPU 32 loads the program in the ROM 36 into a RAM 37 and executes various steps written in the program. A VRAM 38 memorizes data of various screens and images to be displayed on the liquid crystal panel 25.

Figure 4:
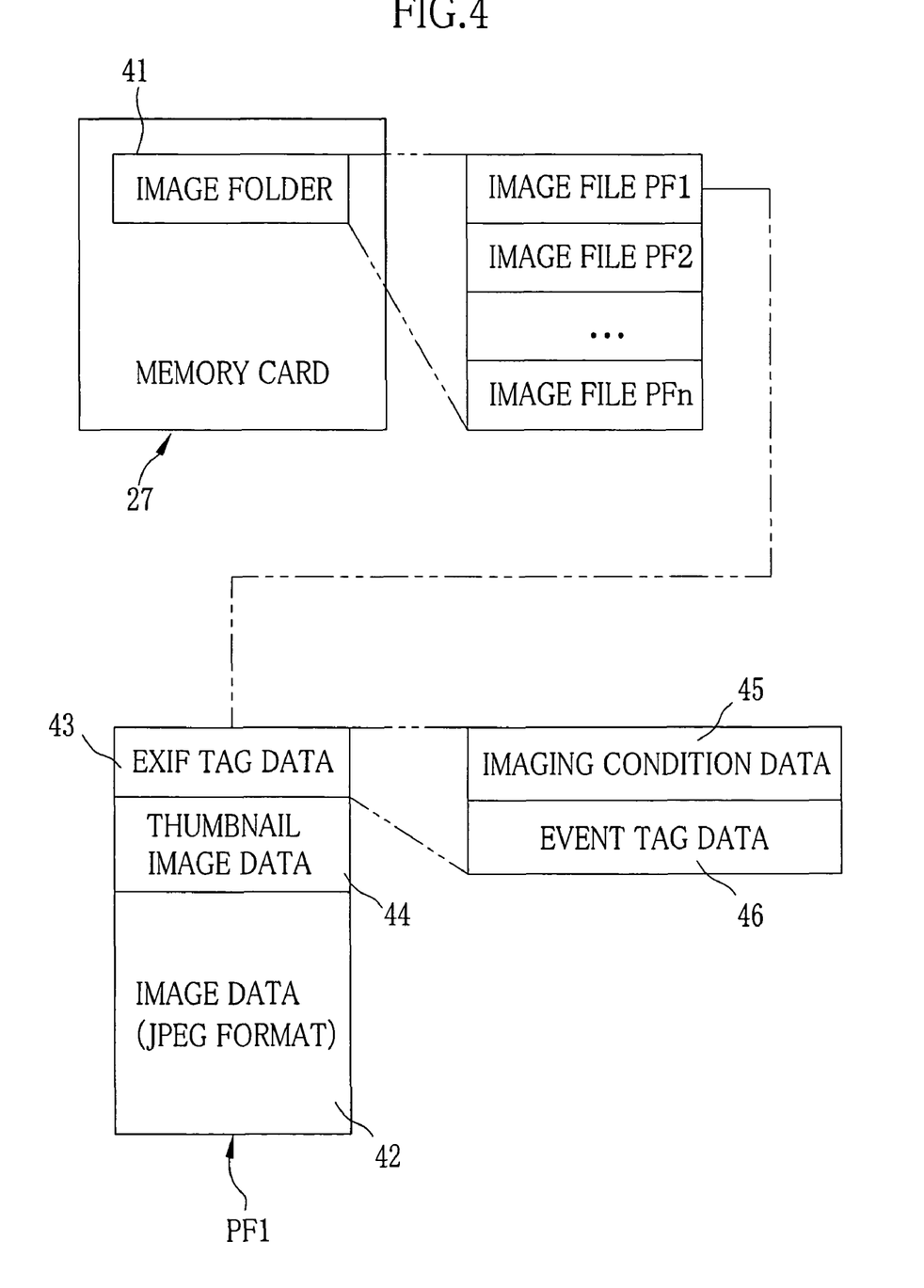
FIG. 4 is a block diagram showing an outline of a structure of an image file.

As shown in FIG. 4, in an image folder 41 in the memory card 27, the image data 42 outputted from the imaging section 30 is recorded as image files PF1 to PFn of EXIF (Exchangeable image file format). In the EXIF, EXIF tag data 43 is attached to the image data 42. In addition, thumbnail image data 44 for an index screen may be included in the EXIF. The image data 42 is for example in JPEG format in which the image data is compressed and then recorded.

As the format of the image data 42, TIFF (Tagged Image File Format), which comprises image data and a tag including information of a stored position of the image data and so on, may be used instead of the JPEG.

The EXIF tag data 43 includes imaging condition data 45 about imaging conditions such as an exposure value, a focal length and presence/absence of flash projection, and event tag data 46 showing an event name. The event tag data 46 is used for grouping the image files PF1 to PFn according to the event name. That is, the plural image files with the event tag data 46 of the same event name constitute one image group. In this embodiment, image files are grouped by the number of the events (n, n+1, . . . ). When no event name is given to the image file, the event tag data 46 showing no event is attached to the image file. The format of each image file PF1 to PFn is not limited to the EXIF, as long as the event tag data can be attached to the image file.

Figure 5:
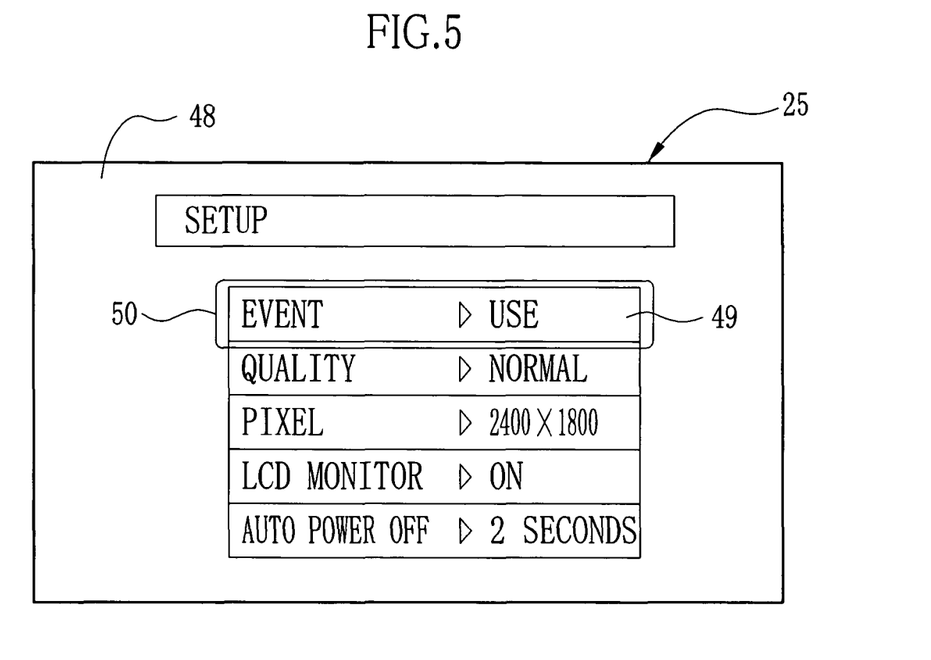
FIG. 5 is an explanatory view showing an example of a setup menu.
Figure 6:
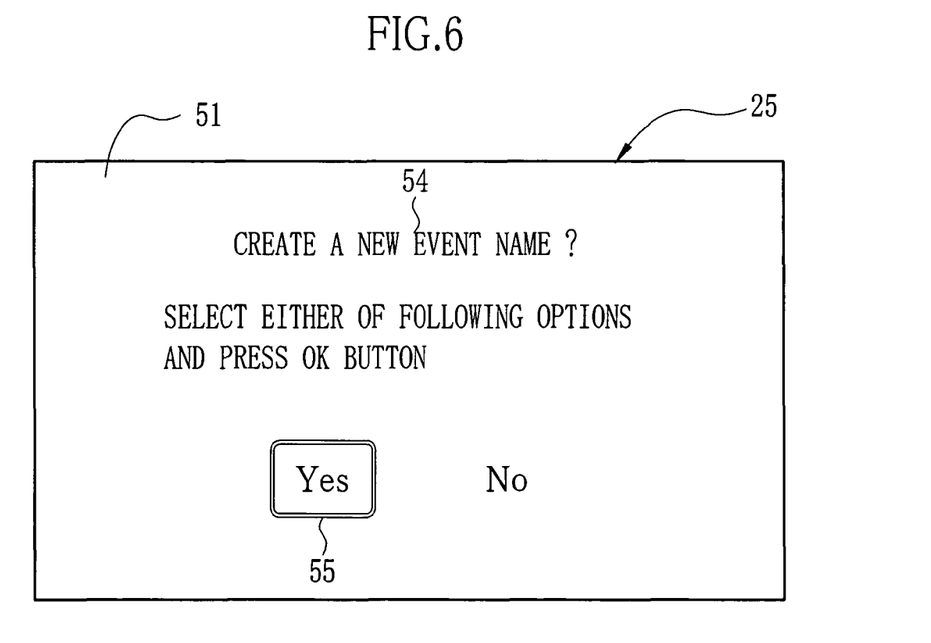
FIG. 6 is an explanatory view showing an event selection screen including two option items.
Figure 7:
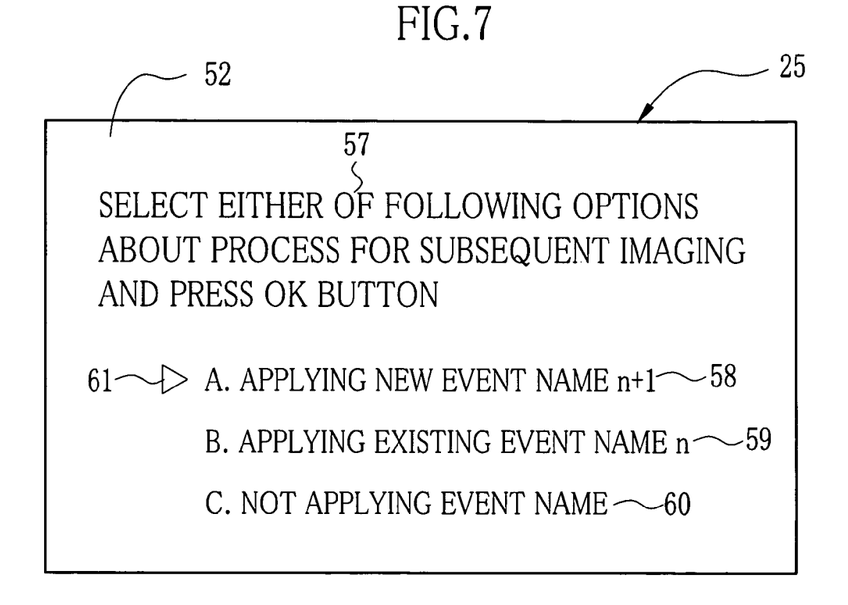
FIG. 7 is an explanatory view showing an event selection screen including three option items.

Whether the event name is applied to the image data or not is selected as follows. At first, the menu/OK button 22 is pressed to display a setup menu 48 shown in FIG. 5. Then the user points a cursor 50 to an event setting item 49 and selects "Use" or "Not use". In case "Use" is selected, an event selection screen 51 shown in FIG. 6 or an event selection screen 52 shown in FIG. 7 is displayed on the liquid crystal panel 25 right after the first operation of the power switch 14 on the day. In case "Not use" is selected, the event selection screens 51 and 52 are not displayed.

The event selection screen 51 is displayed when there is no image file with the event name in the memory card 51. The event selection screen 51 includes an asking sentence 54 that is "Create a new event name? Select either of following options and press OK button", and option items "Yes" and "No". In case "Yes" is selected, the event tag data 46 showing "Event 1" is applied to the image file for the captured image data to be recorded in the memory card 27. In case "No" is selected, the event tag data 46 showing "No event" is applied to the image file.

In default, a frame cursor 55 surrounds the item "Yes" to select "Yes". To move the frame cursor 55, the user depresses the right or left end of the multipurpose key 21. After selecting "Yes" or "No" by the frame cursor 55, the menu/OK button 22 is depressed to perform the selected processes described above and then the display of the event selection screen 51 disappears. After that, the event selection screen 51 is not displayed even when the power switch 14 is operated until the date is changed.

The event selection screen 52 is displayed when there is the image file of "Event n" (n is natural number). The event selection screen 52 includes an asking sentence 57 that is "Select either of following options about process for subsequent imaging and press OK button", an option item 58 that is "A. Applying new event name n+1", an option item 59 that is "B. Applying existing event name n", and an option item 60 that is "C. Not applying event name".

In case the option item 58 is selected, the event tag data 46 showing "Event n+1" is applied to the image file for the captured image data to be recorded in the memory card 27. In case the option item 59 is selected, the event tag data 46 showing "Event n" is applied to the image file. In case the option item 60 is selected, the event tag data 46 showing "No event" is applied to the image file.

In default, a triangular cursor 61 points the option item 58. To move the triangular cursor 61, the user operates the multipurpose key 21. After selecting one of the option items 58 to 60 by moving the triangular cursor 61, the menu/OK button 22 is depressed to perform the selected processes described above and then the display of the event selection screen 52 disappears. After that, the event selection screen 52 is not displayed even when the power switch 14 is operated until the date is changed.

Figure 8:
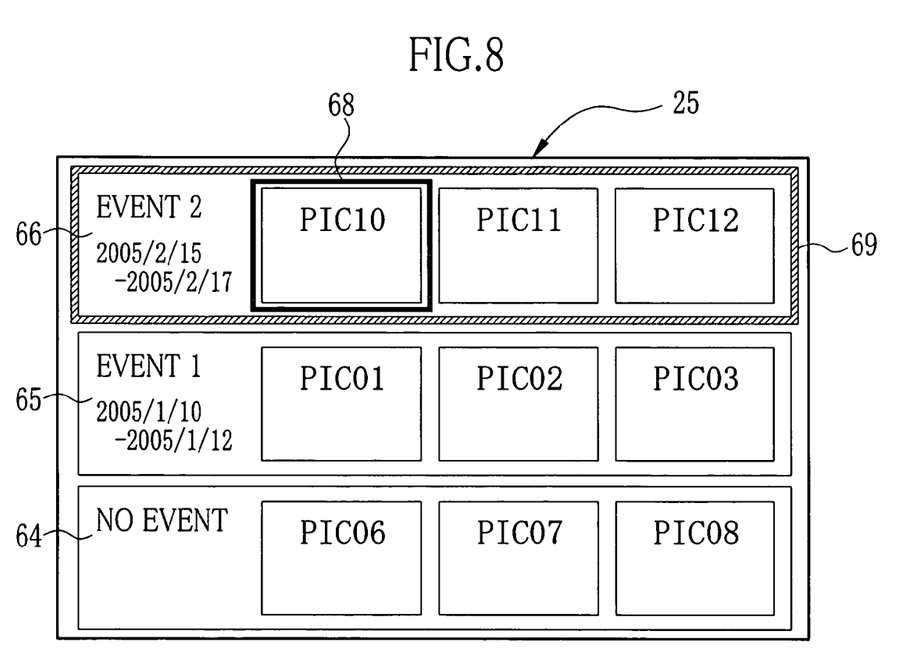
FIG. 8 is an explanatory view showing an example of a reproducing screen.

When the mode selection SW 19 is operated to switch to the reproduction mode, the CPU 32 loads a program for reproducing images from the ROM 36 into the RAM 37 and executes the program. Accordingly, the captured images are displayed on the liquid crystal panel 25 as shown in FIG. 8. At this time, the program for reproducing images executes reading of the event tag data of each image file PF1 to PFn and grouping of images PIC1 to PICn of the image files PF1 to PFn based on the event names. Each group of images (having the same event name) is surrounded by a rectangular frame on the display. In addition, the program for reproducing images executes reading of an image-captured date of each image file and displaying of a period of the event (group) below each event name on the display.

In this embodiment, the images PIC6 to PIC8 out of the group 64 of "No event" including the images PIC6 to PIC9, the images PIC1 to PIC3 out of the group 65 of "Event 1" including the images PIC1 to PIC5, and the images PIC10 to PIC12 out of the group 66 of "Event 2" including the images PIC10 to PIC14 are displayed.

The group 64 is displayed in the lowest portion of the reproducing screen on the liquid crystal panel 25. The groups 65, 66 . . . are displayed above the group 24 such that the group having a later image-captured date is positioned at higher portion of the reproducing screen. In this embodiment, to automate the application of new event names, each event name is formed as "Event n", in which "n" is automatically incremented every time a new event name is created. Accordingly, as identification information of the each group, "n" of "Event n" and the period of the event are displayed. For easy visual distinction between the groups, the rectangular frames for surrounding respective groups have different colors each other. For example, the frame for the group 64 is white, the frame for the group 65 is orange, and the frame for the group 66 is green.

In addition, a selected image (PIC10 in the figure) is surrounded by a cursor frame 68 of for example black, and a selected event ("Event 2" in the figure) is surrounded by a heavy-line frame 69 of for example blue. When the user depresses the upper or lower end of the multipurpose key 21, the heavy-line frame 69 is moved upward or downward event name by event name to scroll the screen in a vertical direction. Accordingly, even if there are four or more events (groups) can be displayed. When the user depresses the right or left end of the multipurpose key 21, the cursor frame 68 is moved toward right or left image by image to scroll the screen in a horizontal direction. Accordingly, the images PIC13 and PIC14 can be displayed. Scrolling each event name and each image realizes speedy searching of desired image.

When the menu/OK button 22 is pressed in this state, the selected image surrounded by the cursor frame 68 is enlarged to full screen of the liquid crystal panel 25. Accordingly, details of the image can be checked. In addition, in the reproducing mode, the user can call up a menu screen by operation of the menu/OK button 22, to display the list of the event tag data of image files and change the event name to another event name or no event name. The change of the event name can be performed on one frame, a plurality of frames, or one event basis.

Figure 9:
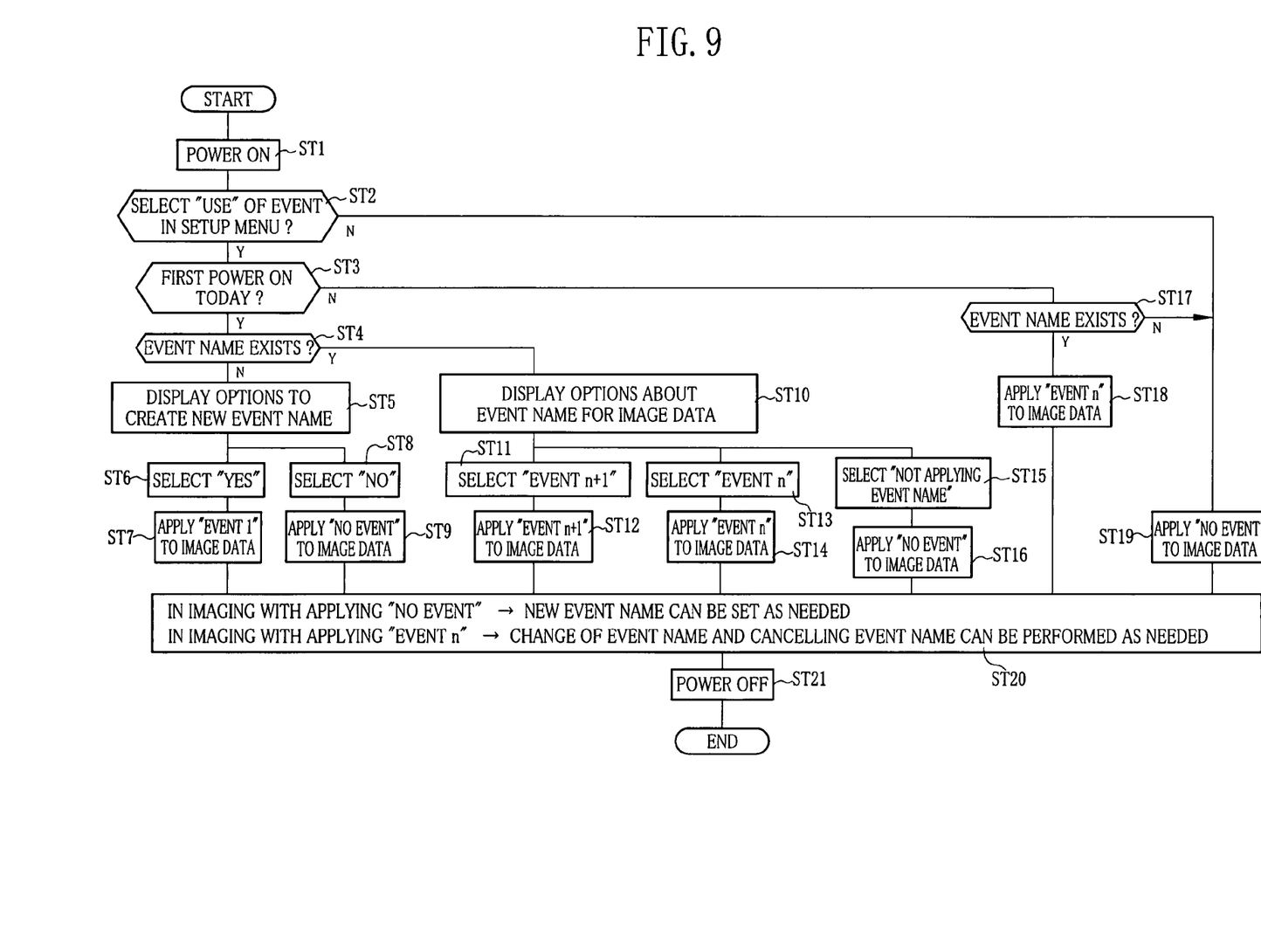
FIG. 9 is a flowchart showing a sequence for selecting an event name.

The operation of the digital camera 10 constituted as described above will be explained with reference to a flowchart shown in FIG. 9. At first, the power switch 14 is operated to turn on the digital camera 10 (ST1). In case the event setting item 49 is set at "Use" in the setup menu 48 (ST2), the CPU 32 detects whether this power on is the first time today (or after the date is changed) or not (ST3).

In case the power on is the first time today, the CPU 32 detects whether there is the image file with the event name in the memory card 27 or not (ST4). In case there is no image file with the event name, the CPU 32 displays the event selection screen 51 on the liquid crystal panel 25 (ST5).

In the event selection screen 51, when the menu/OK button 22 is pressed in the default state, "Yes" is selected (ST6) and then the event tag data 46 showing "Event 1" is applied to the image file for the image data obtained by following image capturing (ST7). When the menu/OK button 22 is pressed after selecting "No" (ST8), the event tag data 46 showing "No event" is applied to the image file for the image data obtained by following image capturing (ST9).

In case there is the image file with "Event n" in the memory card 27 (ST4), the event selection screen 52 is displayed on the liquid crystal panel 25 (ST10). When the option item 58 (A. Apply new event name n+1) is selected and the menu/OK button 22 is pressed (ST11), the event tag data 46 showing "Event n+1" is applied to the image file for the image data obtained by following image capturing (ST12).

When the option item 59 (B. Applying exiting event name n) is selected and the menu/OK button 22 is pressed (ST13), the event tag data 46 showing "Event n" is applied to the image file for the image data obtained by following image capturing (ST14)

When the option item 60 (C. Not applying event name) is selected and the menu/OK button 22 is pressed (ST15), the event tag data 46 showing "No event" is applied to the image file for the image data obtained by following image capturing (ST16).

In case the power on is not the first time today, that is, the power switch 14 is operated two or more times after the date is changed (ST3), the CPU 32 does not display the event selection screens 51, 52 but detects whether there is the image file with the event name in the memory card 27 or not (ST17). In case there is, the event tag data 46 showing "Event n" (obtained by the most recent image capturing) is applied to the image file for the image data obtained by following image capturing (ST18). In case there is not, the event tag data 46 showing "No event" is applied to the image file for the image data obtained by following image capturing (ST19), as same as the case that the event setting item 49 is set at "Not use" in the setup menu 48.

Note that even when the image capturing is performed under the setting for "No event", the user can change this setting by pressing the menu/OK button 22 to display the setup menu 48 and setting the event setting item 49 to "Use". Accordingly, the event tag data 46 showing the new event name can be applied to the image file for the image data obtained by following image capturing (ST20).

In addition, even when the image capturing is performed with applying "Event n" which is the existing event name, the user can change this setting anytime by pressing the menu/OK button 22 to display the setup menu 48 and then pressing the menu/OK button 22 to display the event selection screen 52. By selecting the option item 58 in the event selection screen 52, the event tag data 46 showing "Event n+1" (the new event name) can be applied to the image file for the image data obtained by following image capturing (ST20). When the event setting item 49 is set to "Not use" in the setup menu, the event tag data 46 showing "No event" is applied to the image file for the image data obtained by following image capturing (ST20).

When the image capturing is finished, the power switch 14 is operated to turn off the digital camera 10 (ST21). In this embodiment, the digital camera 10 is automatically turned off by an auto power-off function after passing two minutes of no operation (see FIG. 5).

As described above, in the digital camera 10, the events (groups) are managed not by hierarchical structure of folders but by the event name, that is, the number of the event. It can prevent problems of compatibility of image storage format, such as a problem that an image in a sub-folder cannot be read out when another model of the digital camera or a card reader is used to read image files in the memory card 27.

When an image viewer software or an electronic album editing software, which can distinguish and read event name of the tag information, is installed in a personal computer, move or copy of the image data can be performed by the personal computer, on a group basis according to the event name of the images in the memory card 27. Note that the electronic album editing software or the like is preferably stored in a CD-ROM or a DVD-ROM packaged in the digital camera 10 as the product.

When the electronic album editing software is activated and the memory card 27 is set in the personal computer, the electronic album editing software reads the event tag data of the image files in the memory card 27, and then displays a screen on the monitor, which asks the user whether to sort the image files by folders or not. When the user directs to execute the folder sorting, the electronic album editing software automatically creates folders for each event name and puts the image files having the same event name in a corresponding folder. Accordingly, the user is free from a tiresome manual sorting of the image files transferred to the personal computer. Note that of course the event name of the folder can be changed to a desired name by the user.

In addition, in case the user brings the memory card 27 to a photo developer where there is a print order receiving apparatus enabling to read the event tag data of the image files, displaying the images on an event basis and a group print order can be easily performed.

In the above-described embodiment, "Event"+the incrementing number "n" is used as the event name. However, the present invention is not limited to this event name. For example, concrete event names such as "Athletic meet", "School play" and the like may be displayed on the liquid crystal panel for selection. In addition, although the image files of still images are used for describing the above embodiment, also image files of videos may be grouped in the same manner as the still images.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera which records an image file to a recording medium, said image file including image data obtained by image capturing and tag information applied to said image data, said digital camera comprising:
   a power switch to turn on said digital camera;
   a detecting section to detect whether said turn on of said digital camera is the first time after the date is changed or not, when said power switch is operated;
   a selecting section to select an event name to be applied to said tag information from plural options when said detection section detects that said turn on is the first time, plural image files including said tag information with same event name constituting an image group;
   an event name applying section to apply information showing said event name selected by said selecting section to said tag information for said image data obtained by said image capturing; and
   further comprising a display section, wherein said plural options to be selected are displayed at said display section, only when said detection section detects that said turn on of said digital camera is the first time after the date is changed.

2. The digital camera claimed in claim 1, wherein said plural options are to apply new event name, to apply an event name existing in said recording medium, and to apply no event name.

3. The digital camera claimed in claim 1, wherein said event name applying section applies information showing said event name selected in the first turn on of said digital camera to said tag information, when said detection section detects that said turn on is not the first time.

4. The digital camera claimed in claim 1, wherein said event name including a number which is automatically incremented when said selecting section selects to apply new event name from said options.

5. An image recording method for recording an image file to a recording medium, said image file including image data obtained by image capturing and tag information applied to said image data, said image recording method comprising steps of:
   turning on an imaging apparatus;
   detecting whether said turn on of said imaging apparatus is the first time after the date is changed or not;
   selecting an event name to be applied to said tag information from plural options when it is detected that said turn on is the first time, plural image files including said tag information with same event name constituting an image group;
   applying information showing said event name selected by said selecting step to said tag information for said image data obtained by following image capturing;
   wherein said plural options are to apply new event name, to apply an event name existing in said recording medium, and to apply no event name; and
   further comprising a step of:
   searching whether there is said image file including said event name or not in said recording medium after said detecting step, three of said options that are to apply new event name, to apply an event name existing in said recording medium, and to apply no event name being displayed on a display in said selecting step when said turn on is the first time and there is said image file including said event name, and two of said options that are to apply new event name and to apply no event name being displayed on said display in said selecting step when said turn on is the first time and there is no said image file including said event name.

6. The image recording method claimed in claim 5, wherein information showing said event name selected in the first turn on of said imaging apparatus is applied to said tag information in said applying step, when it is detected that said turn on is not the first time in said detecting step.

7. The image recording method claimed in claim 5, wherein said event name including a number which is automatically incremented when applying new event name is selected from said options in said selecting step.

8. The image recording method claimed in claim 5, further comprising a step of:
   setting whether to apply said event name or not, said detecting step and said selecting step being performed only when applying event name is set, and information showing no event name being applied to said tag information in said applying step when not applying said event name is set.

9. The image recording method claimed in claim 5, wherein in said applying step, information showing said event name selected in the first turn on of said imaging apparatus is applied to said tag information when said turn on is not the first time and there is said image file including said event name, and information showing no event name is applied to said tag information when said turn on is not the first time and there is no said image file including said event name.

\* \* \* \* \*